(12) United States Patent
Giordani et al.

(10) Patent No.: US 12,718,633 B2
(45) Date of Patent: Aug. 25, 2026

(54) EVENT MONITORING SYSTEM AND METHOD

(71) Applicant: AutoScope Labs Inc., Lake Grove, NY (US)

(72) Inventors: Eugene Giordani, Lake Grove, NY (US); Maria Santos, Lake Grove, NY (US)

(73) Assignee: AUTOSCOPE LABS INC., Lake Grove, NY (US)

( * ) Notice: Subject to any disclaimer, the term of this patent is extended or adjusted under 35 U.S.C. 154(b) by 0 days.

(21) Appl. No.: 19/060,012

(22) Filed: Feb. 21, 2025

(65) Prior Publication Data

US 2025/0263043 A1 Aug. 21, 2025

Related U.S. Application Data

(60) Provisional application No. 63/726,061, filed on Nov. 27, 2024, provisional application No. 63/664,207, filed on Jun. 26, 2024, provisional application No. 63/556,010, filed on Feb. 21, 2024.

(51) Int. Cl.
*G07C 5/00* (2006.01)
*B60R 25/102* (2013.01)
*G06Q 50/26* (2012.01)
*H04W 4/90* (2018.01)

(52) U.S. Cl.
CPC ............ *G07C 5/008* (2013.01); *B60R 25/102* (2013.01); *G06Q 50/26* (2013.01); *H04W 4/90* (2018.02)

(58) Field of Classification Search
CPC ....... B60R 25/102; G06Q 50/26; G07C 5/008
USPC .................................................... 340/426.18
See application file for complete search history.

(56) References Cited

U.S. PATENT DOCUMENTS 5,055,851 A * 10/1991 Sheffer ................. B60R 25/102 380/58
5,513,244 A * 4/1996 Joao ........................ B60R 25/33 340/425.5
5,926,086 A * 7/1999 Escareno ................ B60R 25/33 340/426.21
6,002,326 A 12/1999 Turner
6,553,308 B1 * 4/2003 Uhlmann ......... G08G 1/096811 340/988
10,246,056 B1 * 4/2019 Goldberg ................ B60R 25/33
10,363,904 B1 * 7/2019 Chim ................... G08B 25/016
10,573,184 B1 * 2/2020 Pandit .................... G08G 1/207
(Continued)

FOREIGN PATENT DOCUMENTS

IN 202141058255 11/2022

OTHER PUBLICATIONS

International Search Report and Written Opinion issued in related Application Serial No. PCT/US2025/016762 on May 6, 2025.
(Continued)

*Primary Examiner* — Brian A Zimmerman
*Assistant Examiner* — Thang D Tran
(74) *Attorney, Agent, or Firm* — Brian J. Colandreo; Heath M. Sargeant; Holland & Knight LLP

(57) ABSTRACT

A method, computer program product, and computing system for: generating a notification concerning the occurrence of a vehicle theft event for a vehicle; providing the notification of the vehicle theft event to law enforcement personnel; and enabling the law enforcement personnel to effectuate one or more remedial actions concerning the vehicle theft event.

24 Claims, 4 Drawing Sheets

(56) References Cited

U.S. PATENT DOCUMENTS 11,012,667 B1 5/2021 Nodder
2002/0036566 A1* 3/2002 Isobe ...................... B60R 25/33 340/426.11
2003/0033413 A1* 2/2003 Willson, Jr. ............ H04W 4/02 709/227
2003/0128104 A1* 7/2003 Lessard ................. B60R 25/406 340/5.2
2003/0149526 A1* 8/2003 Zhou ..................... G01S 5/0027 701/408
2004/0075539 A1* 4/2004 Savoie ................ B60R 25/2072 340/426.1
2004/0075541 A1* 4/2004 Simoneau ............... B60R 25/06 340/426.11
2006/0122774 A1* 6/2006 Nou ........................ B60R 25/33 701/32.4
2006/0261981 A1* 11/2006 Romano ................. B60R 25/33 340/988
2007/0075849 A1* 4/2007 Pitt ....................... B60R 25/102 340/426.2
2010/0148947 A1 6/2010 Morgan et al.
2011/0149078 A1* 6/2011 Fan ...................... H04N 23/661 348/E5.042
2012/0126967 A1* 5/2012 McCormick ........ B60C 23/0408 340/445
2014/0139331 A1* 5/2014 Oliver ..................... B60R 25/04 340/426.19
2014/0306799 A1 10/2014 Ricci
2014/0357216 A1* 12/2014 Armitage ................ H04W 4/90 455/404.2
2015/0022663 A1 1/2015 Wang et al.
2015/0095251 A1* 4/2015 Alazraki ................ G06Q 10/00 705/325
2016/0006922 A1* 1/2016 Boudreau ............ H04N 23/661 348/207.1
2016/0112461 A1* 4/2016 Othmer ................. H04L 63/102 726/29
2016/0351089 A1* 12/2016 Salem ....................... B64B 1/58
2017/0021764 A1* 1/2017 Adams ................... G06Q 40/08
2017/0115126 A1* 4/2017 McMaster ........... H04W 68/005
2018/0186335 A1* 7/2018 Chuang ................. B60R 25/102
2018/0297482 A1* 10/2018 Spähn ..................... B60L 53/65
2019/0174279 A1* 6/2019 Verma ................. G07B 15/063
2019/0279447 A1 9/2019 Ricci
2019/0357005 A1* 11/2019 Brady ................... H04W 4/021
2020/0098206 A1* 3/2020 Dugas .................... G07C 5/008
2020/0104326 A1 4/2020 Ricci
2020/0139929 A1 5/2020 Turley
2020/0156537 A1* 5/2020 Elswick ............... G08B 25/016
2020/0160633 A1* 5/2020 Zhang ................... B60R 25/102
2020/0213287 A1* 7/2020 Zhang ................... H04L 63/123
2020/0285249 A1* 9/2020 Woods ................. G05D 1/0246
2021/0026019 A1* 1/2021 Gahagan ............... G01S 17/931
2021/0158639 A1* 5/2021 Westra ...................... H04L 9/30
2021/0170992 A1* 6/2021 Braun ..................... B60R 25/33
2022/0169207 A1* 6/2022 Moeller ................ B60R 25/245
2022/0284796 A1* 9/2022 Ishikawa .......... G08B 13/19647
2022/0366336 A1* 11/2022 Khasis ..................... G08G 1/04
2023/0068712 A1* 3/2023 Duan ................ B60W 60/0015
2023/0103625 A1* 4/2023 Burrell ................... G06Q 50/26 705/325
2023/0123587 A1* 4/2023 Jatt ....................... B60W 30/06 701/23
2024/0190441 A1* 6/2024 Kubota .................. A61B 5/024

OTHER PUBLICATIONS

International Search Report and Written Opinion issued in related Application Serial No. PCT/US2025/016770 on Apr. 8, 2025.

Non-Final Office Action issued in related U.S. Appl. No. 19/059,970 on Apr. 24, 2025.

Notice of Allowance issued in related U.S. Appl. No. 19/059,970 on Nov. 10, 2025.

Notice of Allowance issued in related U.S. Appl. No. 19/059,970 on Feb. 4, 2026.

* cited by examiner

EVENT MONITORING SYSTEM AND METHOD

PRIORITY APPLICATION

This application claims the benefit of U.S. Provisional Application No. 63/556,010 filed on 21 Feb. 2024; 63/664,207 filed on 26 Jun. 2024; and 63/726,061 filed on 27 Nov. 2024, the entire contents of which are herein incorporated by reference.

TECHNICAL FIELD

This disclosure relates to event monitoring systems and methods and, more particularly, to systems and methods for monitoring vehicle events.

BACKGROUND

The history of electronic monitoring for vehicle theft has been shaped by technological advancements and the persistent challenge of auto theft. In the early days, vehicle security primarily relied on mechanical deterrents such as steering wheel locks, ignition locks, and basic alarm systems. While these measures provided some level of protection, they were relatively easy for experienced thieves to bypass. As car theft became more sophisticated, the need for advanced electronic solutions grew.

One of the most significant breakthroughs in vehicle theft prevention came in the 1990s with the widespread adoption of electronic immobilizers. These systems relied on transponder chips embedded in car keys, which communicated with the vehicle's onboard computer. Without the correct authentication signal, the engine would not start, making hot-wiring nearly impossible. Many governments, recognizing the effectiveness of immobilizers, mandated their inclusion in new vehicles, significantly reducing theft rates.

Around the same time, vehicle tracking technology began to emerge as a powerful tool for recovering stolen cars. Companies like LoJack pioneered radio frequency-based tracking systems, allowing law enforcement to locate and retrieve stolen vehicles quickly.

With the rise of telematics in the 2000s, vehicle monitoring became even more sophisticated. Automakers began integrating advanced security features into connected cars, allowing for real-time data transmission, remote diagnostics, and geofencing alerts.

More recently, the advent of artificial intelligence (AI) and machine learning has further enhanced vehicle security. Modern systems analyze driving patterns and detect unusual activity, such as unauthorized access attempts or sudden location changes, triggering alerts to vehicle owners. Some high-end vehicles now incorporate biometric authentication, such as fingerprint or facial recognition, to prevent unauthorized use.

Despite these advancements, car thieves have also adapted to new security measures. Relay attacks, in which thieves use signal amplifiers to intercept and extend key fob signals, have become a growing concern, enabling criminals to unlock and start vehicles without physical access to the key. As a response, automakers and security firms continue to innovate, developing signal-blocking key pouches, encrypted key fob signals, and AI-driven threat detection systems.

SUMMARY OF DISCLOSURE

Concept 2—Law Enforcement

In one implementation, a computer-implemented method, executed on a computing device, includes: generating a notification concerning the occurrence of a vehicle theft event for a vehicle; providing the notification of the vehicle theft event to law enforcement personnel; and enabling the law enforcement personnel to effectuate one or more remedial actions concerning the vehicle theft event.

One or more of the following features may be included. Criteria may be defined that identifies the vehicle theft event for the vehicle. Telematic information received concerning the vehicle may be accessed, thus defining vehicle-specific telematic information. The vehicle-specific telematic information may be processed to determine if the vehicle theft event has occurred. Accessing telematic information received concerning the vehicle may include: accessing a third party data repository that contains the telematic information via an application program interface. Processing the vehicle-specific telematic information to determine if the vehicle theft event has occurred may include: processing the vehicle-specific telematic information to determine if the vehicle has moved outside of a geofenced region. The notification of the vehicle theft event may be provided to the owner of the vehicle. Enabling the law enforcement personnel to effectuate one or more remedial actions concerning the vehicle theft event may include: enabling the law enforcement personnel to dispatch personnel to investigate the vehicle theft event. Enabling the law enforcement personnel to effectuate one or more remedial actions concerning the vehicle theft event may include: enabling the law enforcement personnel to dispatch a drone to investigate the vehicle theft event. Enabling the law enforcement personnel to effectuate one or more remedial actions concerning the vehicle theft event may include: enabling the law enforcement personnel to initiate a Be On the LookOut (BOLO) bulletin concerning the vehicle theft event. The notification of the vehicle theft event may define a last known location of the vehicle. Enabling the law enforcement personnel to effectuate one or more remedial actions concerning the vehicle theft event may include: notifying law enforcement personnel proximate the last known location of the vehicle of the vehicle theft event.

In another implementation, a computer program product resides on a computer readable medium and has a plurality of instructions stored on it. When executed by a processor, the instructions cause the processor to perform operations including: generating a notification concerning the occurrence of a vehicle theft event for a vehicle; providing the notification of the vehicle theft event to law enforcement personnel; and enabling the law enforcement personnel to effectuate one or more remedial actions concerning the vehicle theft event.

One or more of the following features may be included. Criteria may be defined that identifies the vehicle theft event for the vehicle. Telematic information received concerning the vehicle may be accessed, thus defining vehicle-specific telematic information. The vehicle-specific telematic information may be processed to determine if the vehicle theft event has occurred. Accessing telematic information received concerning the vehicle may include: accessing a third party data repository that contains the telematic information via an application program interface. Processing the vehicle-specific telematic information to determine if the vehicle theft event has occurred may include: processing the vehicle-specific telematic information to determine if the vehicle has moved outside of a geofenced region. The notification of the vehicle theft event may be provided to the owner of the vehicle. Enabling the law enforcement personnel to effectuate one or more remedial actions concerning the vehicle theft event may include: enabling the law enforcement personnel to dispatch personnel to investigate the vehicle theft event. Enabling the law enforcement personnel to effectuate one or more remedial actions concerning the vehicle theft event may include: enabling the law enforcement personnel to dispatch a drone to investigate the vehicle theft event. Enabling the law enforcement personnel to effectuate one or more remedial actions concerning the vehicle theft event may include: enabling the law enforcement personnel to initiate a Be On the LookOut (BOLO) bulletin concerning the vehicle theft event. The notification of the vehicle theft event may define a last known location of the vehicle. Enabling the law enforcement personnel to effectuate one or more remedial actions concerning the vehicle theft event may include: notifying law enforcement personnel proximate the last known location of the vehicle of the vehicle theft event.

In another implementation, a computing system including a processor and memory is configured to perform operations including: generating a notification concerning the occurrence of a vehicle theft event for a vehicle; providing the notification of the vehicle theft event to law enforcement personnel; and enabling the law enforcement personnel to effectuate one or more remedial actions concerning the vehicle theft event.

One or more of the following features may be included. Criteria may be defined that identifies the vehicle theft event for the vehicle. Telematic information received concerning the vehicle may be accessed, thus defining vehicle-specific telematic information. The vehicle-specific telematic information may be processed to determine if the vehicle theft event has occurred. Accessing telematic information received concerning the vehicle may include: accessing a third party data repository that contains the telematic information via an application program interface. Processing the vehicle-specific telematic information to determine if the vehicle theft event has occurred may include: processing the vehicle-specific telematic information to determine if the vehicle has moved outside of a geofenced region. The notification of the vehicle theft event may be provided to the owner of the vehicle. Enabling the law enforcement personnel to effectuate one or more remedial actions concerning the vehicle theft event may include: enabling the law enforcement personnel to dispatch personnel to investigate the vehicle theft event. Enabling the law enforcement personnel to effectuate one or more remedial actions concerning the vehicle theft event may include: enabling the law enforcement personnel to dispatch a drone to investigate the vehicle theft event. Enabling the law enforcement personnel to effectuate one or more remedial actions concerning the vehicle theft event may include: enabling the law enforcement personnel to initiate a Be On the LookOut (BOLO) bulletin concerning the vehicle theft event. The notification of the vehicle theft event may define a last known location of the vehicle. Enabling the law enforcement personnel to effectuate one or more remedial actions concerning the vehicle theft event may include: notifying law enforcement personnel proximate the last known location of the vehicle of the vehicle theft event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
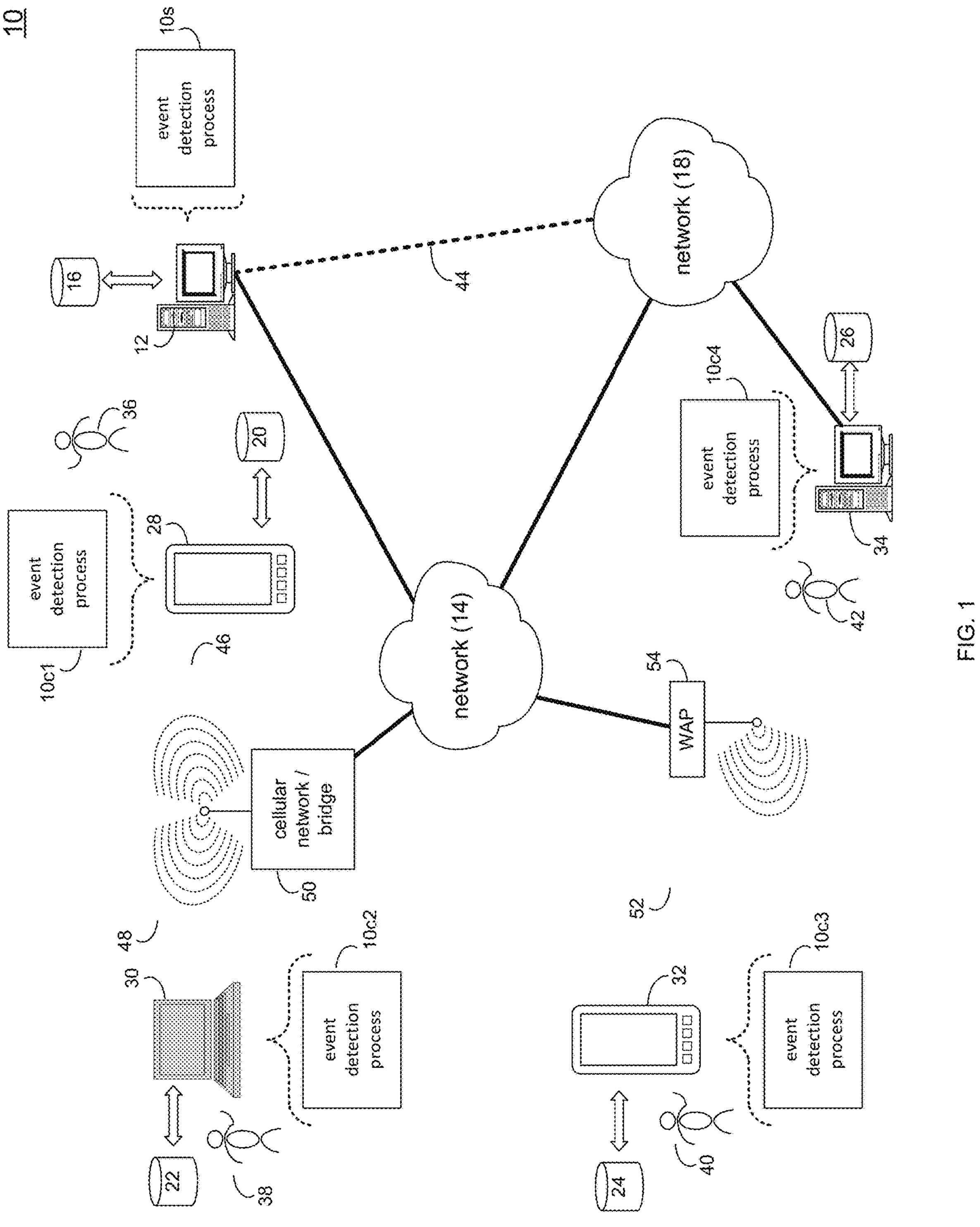
FIG. 1 is a diagrammatic view of a distributed computing network including a computing device that executes an event detection process according to an implementation of the present disclosure.

System Overview:

Referring to FIG. 1, there is shown event detection process 10. As will be discussed below in greater detail, event detection process 10 may monitor for the occurrence of a reporting event (e.g., a vehicle theft event, a vehicle vandalism event, a vehicle accident event, and a vehicle assistance event). And upon detecting the same, event detection process 10 may report the same and/or initiate one or more remedial procedures.

Event detection process 10 may be implemented as a server-side process, a client-side process, or a hybrid server-side/client-side process. For example, event detection process 10 may be implemented as a purely server-side process via event detection process 10*s*. Alternatively, event detection process 10 may be implemented as a purely client-side process via one or more of event detection process 10*c*1, event detection process 10*c*2, event detection process 10*c*3, and event detection process 10*c*4. Alternatively still, event detection process 10 may be implemented as a hybrid server-side/client-side process via event detection process 10*s* in combination with one or more of event detection process 10*c*1, event detection process 10*c*2, event detection process 10*c*3, and event detection process 10*c*4. Accordingly, event detection process 10 as used in this disclosure may include any combination of event detection process 10*s*, event detection process 10*c*1, event detection process 10*c*2, event detection process 10*c*3, and event detection process 10*c*4.

Event detection process 10*s* may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a dedicated network device.

The instruction sets and subroutines of event detection process 10*s*, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive;

a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of event detection processes **10*c*1, 10*c*2, 10*c*3, 10*c*4 may include but are not limited to a web browser, a game console user interface, or a specialized application (e.g., an application running on e.g., the Android™ platform or the iPhone™ platform). The instruction sets and subroutines of roadside assistance applications 10*c*1, 10*c*2, 10*c*3, 10*c*4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26** may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Additionally/alternatively, virtual desktops and virtual machines may be utilized to access event detection process 10. As is known in the art, a virtual machine (VM) is a software-based emulation of a physical computer, allowing multiple operating systems to run simultaneously on a single physical machine. It functions as an isolated environment that mimics the hardware of a computer, enabling users to install and operate operating systems and applications as if they were on a dedicated physical device. Virtual machines are managed by a hypervisor, which allocates resources such as CPU, memory, and storage to each VM while ensuring they operate independently from one another. This technology is widely used for software testing, running legacy applications, server consolidation, and creating secure environments. By abstracting hardware, virtual machines provide flexibility, scalability, and cost efficiency in both development and production settings. As is known in the art, a virtual desktop is a computing environment that allows users to access a desktop operating system and applications hosted on a remote server rather than a local device. Delivered through technologies like Virtual Desktop Infrastructure (VDI) or cloud services, a virtual desktop provides a consistent, customizable workspace accessible from various devices, including laptops, tablets, and smartphones. This setup enables centralized management of desktops, ensuring that updates, security, and backups are handled on the server side, enhancing IT efficiency and reducing maintenance costs. Virtual desktops are widely used for remote work, as they allow employees to securely access their work environment from anywhere, while businesses benefit from enhanced data security, scalability, and reduced hardware dependency.

Users 36, 38, 40, 42 may access event detection process 10 directly through network 14 or through secondary network 18. Further, event detection process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
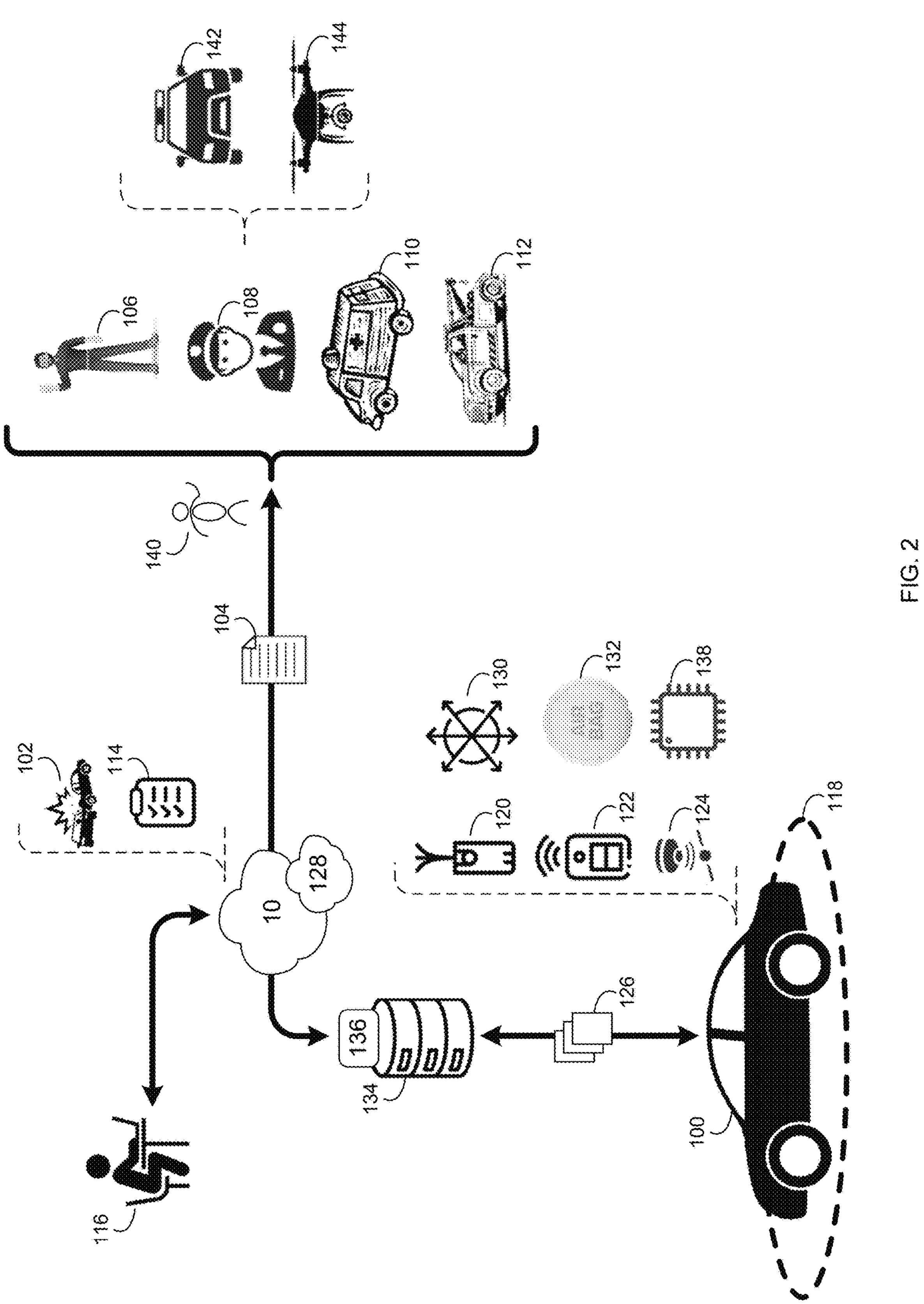
FIG. 2 is a diagrammatic view of an event monitored by the event detection process of FIG. 1.

Event Detection Process (Overview):

As discussed above and referring also to FIG. 2, event detection process 10 may monitor the status of a vehicle (e.g., vehicle 100) to determine whether a reporting event (e.g., reporting event 102) has occurred. Examples of such a reporting event (e.g., reporting event 102) may include but is not limited to a vehicle theft event, a vehicle vandalism event, a vehicle accident event, and a vehicle assistance event.

A vehicle theft event refers to a situation where a monitoring system (e.g., event detection process 10) detects unauthorized access or movement of the vehicle (e.g., vehicle 100), indicating a possible theft attempt. This could be triggered by forced entry, ignition without a valid key, or the vehicle (e.g., vehicle 100) moving without proper authorization.

A vehicle vandalism event occurs when a monitoring system (e.g., event detection process 10) detects damage to the vehicle (e.g., vehicle 100) caused by external forces, such as broken windows, scratched paint, or defaced surfaces. This can be identified using impact sensors, motion detectors, or even surveillance cameras integrated into the vehicle (e.g., vehicle 100).

A vehicle accident event may involve the monitoring system (e.g., event detection process 10) detecting a collision or sudden impact, typically using accelerometers, gyroscopes, and crash sensors included within the vehicle (e.g., vehicle 100).

A vehicle assistance event may involve situations where the driver or occupants require help due to mechanical failure, a flat tire, low fuel, or other operational issues. The monitoring system (e.g., event detection process 10) may monitor vehicle diagnostics in real time.

As will be discussed below and in the event that such a reporting event (e.g., reporting event 102) is detected, notifications (e.g., notification 104) may be made and the notified party (e.g., owner 106, law enforcement personnel 108, emergency personnel 110 and/or roadside assistance personnel 112) may effectuate one or more remedial actions.

Concept 1-Detection

As will be discussed below in greater detail, event detection process 10 may monitor the status of a vehicle (e.g., vehicle 100) to determine if the vehicle (e.g., vehicle 100) is experiencing a reporting event (e.g., reporting event 102).

Figure 3:
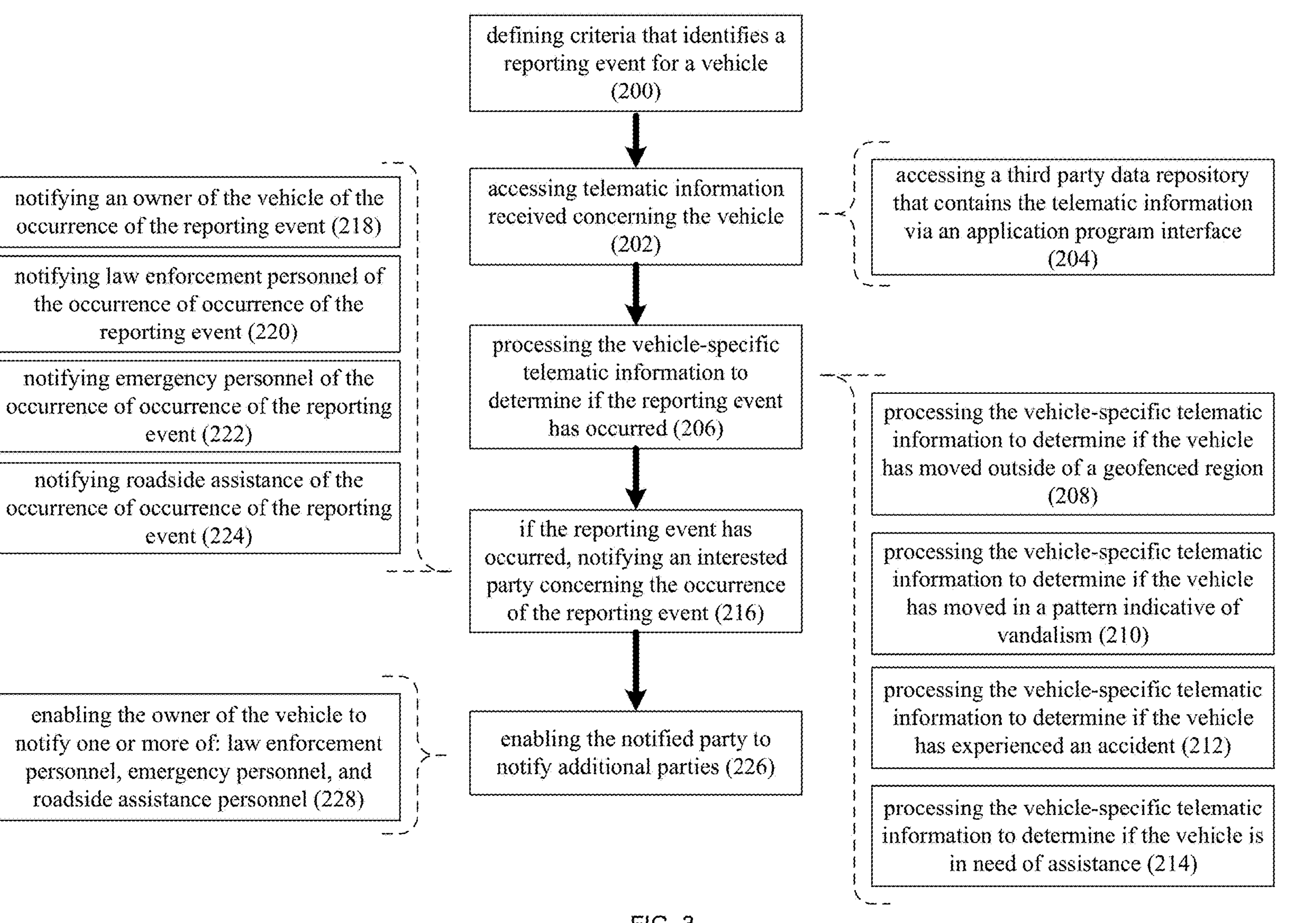
FIG. 3 is a flowchart of an implementation of the event detection process of FIG. 1 according to an implementation of the present disclosure.

Referring also to FIG. 3, event detection process 10 may define 200 criteria (e.g., criteria 114) that identifies such reporting events (e.g., reporting event 102) for the vehicle (e.g., vehicle 100). As discussed above, examples of such a reporting event (e.g., reporting event 102) may include but are not limited to a vehicle theft event, a vehicle vandalism event, a vehicle accident event, and a vehicle assistance event. Such criteria (e.g., criteria 114) may be defined by a user (e.g., user 116) of event detection process 10, wherein such user (e.g., user 116) may be owner 106 or an administrator of event detection process 10.

Concerning the criteria (e.g., criteria 114) defined 200 for these reporting events (e.g., reporting event 102), such criteria may vary depending upon the type of reporting event (e.g., reporting event 102).

For example and concerning a vehicle theft event which refers to a situation where a monitoring system (e.g., event detection process 10) detects unauthorized access or movement of a vehicle (e.g., vehicle 100), such "vehicle theft" criteria (e.g., criteria 114) may include but is not limited to the vehicle (e.g., vehicle 100) being moved from its parking space, the immobilizer of the vehicle (e.g., vehicle 100) being bypassed, the door of the vehicle (e.g., vehicle 100) being opened without the alarm being disabled, and the vehicle (e.g., vehicle 100) being placed at an extreme angle (e.g., as if being pulled onto a car carrier). Accordingly, such "vehicle theft" criteria (e.g., criteria 114) defined by the user (e.g., user 116) may include but is not limited to the vehicle (e.g., vehicle 100) being moved outside of its geofenced location (e.g., geofenced location 118); an immobilizer (e.g., immobilizer 120) of the vehicle (e.g., vehicle 100) indicating that it has been bypassed/disabled, the triggering of an alarm (e.g., alarm 122) of the vehicle (e.g., vehicle 100), and an angle sensor (e.g., angle sensor 124) of the vehicle (e.g., vehicle 100) indicating that the vehicle (e.g., vehicle 100) has been placed at a considerable angle (e.g., a 15 degrees change with respect to the original angle).

A geofenced location (e.g., geofenced location 118) of a vehicle (e.g., vehicle 100) refers to a virtual boundary or predefined geographic area set by the vehicle owner (e.g., owner 106) or monitoring system (e.g., event detection process 10). This boundary is defined using GPS coordinates, creating a "safe zone" where the vehicle (e.g., vehicle 100) is expected to remain. If the vehicle (e.g., vehicle 100) moves outside of this designated area, the system may immediately detects the breach and triggers an alert. Geofencing is particularly useful in vehicle theft detection systems (e.g., event detection process 10) because it adds an extra layer of monitoring. If a vehicle (e.g., vehicle 100) is stolen and driven outside the established geofenced zone (e.g., geofenced location 118), the system (e.g., event detection process 10) can quickly alert the owner (e.g., owner

106) or law enforcement (e.g., law enforcement personnel 108) of the unauthorized movement, allowing for a rapid response.

All of the information needed to identify a vehicle theft event may be obtained by processing telematic information (e.g., vehicle-specific telematic information 126) that is available concerning the vehicle (e.g., vehicle 100). Telematic information (e.g., vehicle-specific telematic information 126) in the context of a vehicle (e.g., vehicle 100) refers to the real-time/quasi-real-time transmission of data collected from various sensors and systems within the vehicle (e.g., vehicle 100). This data may include a wide range of information, such as the vehicle's location (via GPS), speed, engine performance, fuel levels, tire pressure, battery health, and even driving patterns like acceleration, braking, and cornering. This data is often sent wirelessly to a cloud-based platform or monitoring system for processing and analysis. Telematic information may be processed to determine the status of a vehicle by analyzing these data points in relation to predefined parameters or thresholds. For example, if the system detects an abnormal drop in tire pressure or an engine misfire, it can flag this as a potential mechanical issue. Similarly, if the location of the vehicle (e.g., vehicle 100) suddenly shifts outside of a geofenced area (e.g., geofenced location 118), it can indicate a theft. Advanced analytics or AI algorithms can also track driving behavior to detect signs of an accident, such as sudden deceleration or impact, and trigger automatic emergency alerts. Additionally, telematics can monitor the health of the vehicle's battery, fuel levels, and other vital components to alert the driver of any upcoming maintenance needs or failures. In essence, telematic information may provide a comprehensive snapshot of the real-time condition and performance of the vehicle (e.g., vehicle 100), enabling interested parties to receive alerts and updates about potential issues or abnormal events, ensuring prompt actions can be taken when necessary.

Additionally, artificial intelligence (e.g., artificial intelligence process 128) may be utilized to identify patterns in the behavior of a vehicle (e.g., vehicle 100) and detect potential theft by analyzing historical data and recognizing deviations from normal routines. For example, if a vehicle typically stays parked in the same location, such as a driveway, between 9:00 PM and 6:00 AM, the event detection process (e.g., event detection process 10) using artificial intelligence process 128 may learn this habitual pattern over time by processing the vehicle's telematic information (e.g., vehicle-specific telematic information 126), including GPS coordinates and timestamps. The artificial intelligence (e.g., artificial intelligence process 128) would be able to establish a "normal" vehicle behavior pattern based upon this information (e.g., vehicle-specific telematic information 126).

Once event detection process 10 has built this baseline, event detection process 10 may continuously monitor the vehicle's location and movements in real-time. If the vehicle (e.g., vehicle 10) leaves its usual parking spot, say, at 2:00 AM . . . or an hour earlier than usual . . . or during a time when it is not typically in use, the artificial intelligence (e.g., artificial intelligence process 128) can recognize this as an anomaly. Event detection process 10 may then flag this event as potentially suspicious. The artificial intelligence (e.g., artificial intelligence process 128) may also take other factors into account, such as the vehicle's speed or direction of travel, to further assess the likelihood of theft. For instance, if the vehicle moves rapidly away from its location and does not follow typical routes or patterns for the owner (e.g., heading toward an unfamiliar area), the artificial intelligence (e.g., artificial intelligence process 128) could identify this as a higher probability of theft. Event detection process 10 may then trigger an alert.

Further and concerning a vehicle vandalism event which occurs when a monitoring system (e.g., event detection process 10) detects damage to the vehicle caused by external forces, such as broken windows, scratched paint, or defaced surfaces, such "vehicle vandalism" criteria (e.g., criteria 114) may include but is not limited to the vehicle (e.g., vehicle 100) moving within its parking space (e.g., as if someone is rummaging through/defacing the vehicle), the immobilizer of the vehicle (e.g., vehicle 100) being bypassed, the door/trunk of the vehicle (e.g., vehicle 100) being opened without the alarm being disabled, and a portion of the vehicle (e.g., vehicle 100) being lifted (e.g., as if it is being jacked up to remove its wheels). Accordingly, such "vehicle vandalism" criteria (e.g., criteria 114) defined by the user (e.g., user 116) may include but is not limited to the vehicle (e.g., vehicle 100) being moved in a manner that is sensed by vehicle-based accelerometers/motion sensors/cameras (e.g., sensors 130); an immobilizer (e.g., immobilizer 120) of the vehicle (e.g., vehicle 100) indicating that it has been bypassed/disabled, the triggering of an alarm (e.g., alarm 122) of the vehicle (e.g., vehicle 100), and an angle sensor (e.g., angle sensor 124) of the vehicle (e.g., vehicle 100) indicating that some portion of the vehicle (e.g., vehicle 100) has been raised (e.g., a 5 degrees change with respect to the original angle).

All of the information needed to identify a vehicle vandalism event may be obtained by processing telematic information (e.g., vehicle-specific telematic information 126) that is available concerning the vehicle (e.g., vehicle 100).

Additionally and concerning a vehicle accident event which involves the monitoring system (e.g., event detection process 10) detecting a collision or sudden impact (e.g., using accelerometers, gyroscopes, and crash sensors), such criteria (e.g., "vehicle accident" criteria 114) may include but is not limited to the vehicle (e.g., vehicle 100) experiencing a hard impact (e.g., an impact that results in deceleration of over 10 Gs), and the vehicle (e.g., vehicle 100) deploying its airbag (e.g., airbag 132). Accordingly, such "vehicle accident" criteria (e.g., criteria 114) defined by the user (e.g., user 116) may include but is not limited to the vehicle (e.g., vehicle 100) being involved in a high G impact event as sensed by vehicle-based accelerometers/motion sensors/cameras (e.g., sensors 130); and the vehicle (e.g., vehicle 100) being involved in an incident that deploys its airbag (e.g., airbag 132).

All of the information needed to identify a vehicle vandalism event may be obtained by processing telematic information (e.g., vehicle-specific telematic information 126) that is available concerning the vehicle (e.g., vehicle 100).

Further and concerning a vehicle assistance event which involves the monitoring system (e.g., event detection process 10) detecting a situation in which the driver or occupants require help, such criteria (e.g., "vehicle assistance" criteria 114) may include but is not limited to the vehicle (e.g., vehicle 100) experiencing a mechanical failure (e.g., a transmission failure), the vehicle (e.g., vehicle 100) experiencing a flat tire/blowout, and the vehicle (e.g., vehicle 100) experiencing an out of fuel condition. Accordingly, such "vehicle assistance" criteria (e.g., criteria 114) defined by the user (e.g., user 116) may include but is not limited to the vehicle (e.g., vehicle 100) identifying a mechanical failure; the vehicle (e.g., vehicle 100) sensing a loss of air pressure in one or more of the tires; and the vehicle (e.g., vehicle 100) sensing a loss of fuel pressure in the fuel injection system.

All of the information needed to identify a vehicle vandalism event may be obtained by processing telematic information (e.g., vehicle-specific telematic information 126) that is available concerning the vehicle (e.g., vehicle 100).

Accordingly, event detection process 10 may access 202 telematic information (e.g., vehicle-specific telematic information 126) received concerning the vehicle (e.g., vehicle 100), thus defining vehicle-specific telematic information (e.g., vehicle-specific telematic information 126). For example and when accessing 202 telematic information (e.g., vehicle-specific telematic information 126) received concerning the vehicle (e.g., vehicle 100), event detection process 10 may access 204 a third party data repository (e.g., data repository 134) that contains the telematic information (e.g., vehicle-specific telematic information 126) via an application program interface (e.g., API 136). An example of such a third party data repository (e.g., data repository 134) may include but is not limited to SmartCar.

Smartcar is a technology company that provides a standardized API platform for accessing connected vehicle data across multiple car brands. It enables developers, businesses, and service providers to integrate telematics data from vehicles without needing to interact directly with multiple automakers' proprietary systems. By offering a manufacturer-agnostic solution, Smartcar simplifies vehicle data retrieval, allowing applications to access key telematic information such as GPS location, odometer readings, fuel or battery levels, tire pressure, lock/unlock status, and engine diagnostics in a secure and standardized way.

Smartcar connects to vehicles through their built-in OEM telematics systems, the same systems that allow modern cars to communicate with mobile apps from their manufacturers. Instead of businesses having to build separate integrations for each automaker, Smartcar provides a single API that works across multiple brands, streamlining the process of accessing telematic data. The system operates by first requiring vehicle owners to grant explicit permission for an application to access their car's data through Smartcar's authentication system, which follows the OAuth 2.0 standard. This ensures that only authorized applications and users can access vehicle data, maintaining security and privacy. Once authorized, Smartcar's API allows applications to request specific telematic data from the vehicle, such as its current location, speed, engine status, and mileage. The vehicle sends this data to the manufacturer's cloud servers, which Smartcar then accesses and delivers to the client application.

One of the key advantages of Smartcar is its ability to standardize vehicle data access without requiring additional hardware, unlike traditional OBD-II dongles. By using a car's built-in connectivity, Smartcar eliminates the need for physical modifications while providing seamless integration. Its use of OAuth 2.0 ensures that user privacy is maintained, and data access is controlled by the vehicle owner. Additionally, its scalable API allows businesses to integrate vehicle telematics without needing custom solutions for each automaker. Overall, Smartcar simplifies the process of accessing and utilizing connected vehicle data, making it a valuable tool for mobility services, fleet management, and security applications.

Telematic information (e.g., vehicle-specific telematic information 126) from a specific vehicle (e.g., vehicle 100) may be wirelessly obtained through a combination of onboard sensors, telematics units, and communication networks. These telematics units, typically integrated into modern vehicles, continuously collect data from various sensors that monitor the vehicle's performance, location, and environmental conditions. The sensors may track metrics like speed, fuel consumption, tire pressure, engine health, GPS coordinates, and even driver behavior (such as braking patterns or acceleration). This data may then be transmitted via wireless communication networks, often using cellular data (4G, 5G), Wi-Fi, or satellite connections, depending on the vehicle's connectivity capabilities and the available infrastructure. Once transmitted, the telematic information (e.g., vehicle-specific telematic information 126) is typically stored in a cloud-based data repository (e.g., data repository 134). This repository (e.g., data repository 134) acts as a secure storage location for the collected data, where it can be indexed, categorized, and easily accessed for analysis (e.g., by event detection process 10). The stored data may be organized in real-time or historical formats, allowing users to track the vehicle's performance over time. The information may then be processed and analyzed using specialized software tools that evaluate various parameters against predefined thresholds. For example, if tire pressure readings fall below a safe level or if the vehicle deviates from its planned route (e.g., it enters a restricted area or a geofenced zone), an alert may be triggered. This stored telematic information (e.g., vehicle-specific telematic information 126) may then be made available to event detection process 10.

To make this telematic information (e.g., vehicle-specific telematic information 126) available to the event detection process (e.g., event detection process 10) via an application program interface (i.e., API), the vehicle's telematics system (e.g., telematic system 138) must be designed to interface with external platforms. For example, the vehicle's telematics system (e.g., telematic system 138) may collect data such as GPS location, speed, tire pressure, and engine performance, which may then be wirelessly transmitted to a central cloud-based repository (e.g., data repository 134). This central cloud-based repository (e.g., data repository 134) is equipped with an API (e.g., API 136) that exposes endpoints for specific data, such as location or sensor readings. When the event detection process (e.g., event detection process 10) needs to assess the status of the vehicle (e.g., vehicle 100), event detection process 10 sends a request to the API (e.g., API 136), specifying the type of data required (e.g., the vehicle's current location or health metrics). The central cloud-based repository (e.g., data repository 134) may process the request and may return the data in a structured format (e.g., JSON or XML). The event detection process (e.g., event detection process 10) may then analyze the data to identify potential events, such as a geofence breach, a sudden impact indicating a collision, or abnormal readings from engine or tire sensors that suggest mechanical issues. If an event (e.g., reporting event 102) is detected, the process (e.g., event detection process 10) may trigger an appropriate response, such as sending an alert to the owner or authorities or activating a vehicle immobilizer. The API (e.g., API 136) may enable the event detection process (e.g., event detection process 10) to continuously monitor the status of the vehicle (e.g., vehicle 100) in real-time or periodically check for anomalies, ensuring that timely interventions can be made based on the data received. This integration between the telematics system (e.g., telematic system 138) and the event detection process (e.g., event detection process 10) may allow for seamless communication and effective vehicle management, including the early detection of theft, vandalism, or mechanical failures.

Event detection process 10 may process 206 the vehicle-specific telematic information (e.g., vehicle-specific telematic information 126) to determine if a reporting event (e.g., reporting event 102) has occurred.

For example and when processing 206 the vehicle-specific telematic information (e.g., vehicle-specific telematic information 126) to determine if the reporting event (e.g., reporting event 102) has occurred, event detection process 10 may process 208 the vehicle-specific telematic information (e.g., vehicle-specific telematic information 126) to determine if the vehicle (e.g., vehicle 100) has moved outside of a geofenced region (e.g., geofenced location 118). As discussed above, indications of a vehicle theft event may include but are not limited to the vehicle (e.g., vehicle 100) being moved from its parking space, the immobilizer of the vehicle (e.g., vehicle 100) being bypassed, the door of the vehicle (e.g., vehicle 100) being opened without the alarm being disabled, and the vehicle (e.g., vehicle 100) being placed at an extreme angle (e.g., as if being pulled onto a car carrier). Accordingly, if the vehicle-specific telematic information (e.g., vehicle-specific telematic information 126) includes such indications, event detection process 10 may determine that a vehicle theft event (e.g., reporting event 102) has occurred.

Further and when processing 206 the vehicle-specific telematic information (e.g., vehicle-specific telematic information 126) to determine if the reporting event (e.g., reporting event 102) has occurred, event detection process 10 may process 210 the vehicle-specific telematic information (e.g., vehicle-specific telematic information 126) to determine if the vehicle (e.g., vehicle 100) has moved in a pattern indicative of vandalism. As discussed above, indications of a vehicle vandalism event may include but are not limited to the vehicle (e.g., vehicle 100) moving within its parking space (e.g., as if someone is rummaging through/defacing the vehicle), the immobilizer of the vehicle (e.g., vehicle 100) being bypassed, the door/trunk of the vehicle (e.g., vehicle 100) being opened without the alarm being disabled, and a portion of the vehicle (e.g., vehicle 100) being lifted (e.g., as if it is being jacked up to remove its wheels). Accordingly, if the vehicle-specific telematic information (e.g., vehicle-specific telematic information 126) includes such indications, event detection process 10 may determine that a vehicle vandalism event (e.g., reporting event 102) has occurred.

Additionally and when processing 206 the vehicle-specific telematic information (e.g., vehicle-specific telematic information 126) to determine if the reporting event (e.g., reporting event 102) has occurred, event detection process 10 may process 212 the vehicle-specific telematic information (e.g., vehicle-specific telematic information 126) to determine if the vehicle (e.g., vehicle 100) has experienced an accident. As discussed above, indications of a vehicle accident event may include but are not limited to the vehicle (e.g., vehicle 100) experiencing a hard impact (e.g., an impact that results in deceleration of over 10 Gs), and the vehicle (e.g., vehicle 100) deploying its airbag (e.g., airbag 132). Accordingly, if the vehicle-specific telematic information (e.g., vehicle-specific telematic information 126) includes such indications, event detection process 10 may determine that a vehicle accident event (e.g., reporting event 102) has occurred.

Further and when processing 206 the vehicle-specific telematic information (e.g., vehicle-specific telematic information 126) to determine if the reporting event (e.g., reporting event 102) has occurred, event detection process 10 may process 214 the vehicle-specific telematic information (e.g., vehicle-specific telematic information 126) to determine if the vehicle (e.g., vehicle 100) is in need of assistance. As discussed above, indications of a vehicle assistance event may include but are not limited to the vehicle (e.g., vehicle 100) experiencing a mechanical failure (e.g., a transmission failure), the vehicle (e.g., vehicle 100) experiencing a flat tire/blowout, and the vehicle (e.g., vehicle 100) experiencing an out of fuel condition. Accordingly, if the vehicle-specific telematic information (e.g., vehicle-specific telematic information 126) includes such indications, event detection process 10 may determine that a vehicle assistance event (e.g., reporting event 102) has occurred.

If the reporting event (e.g., reporting event 102) has occurred, event detection process 10 may notify 216 an interested party concerning the occurrence of the reporting event (e.g., reporting event 102), thus defining a notified party (e.g., notified party 140).

For example and when notifying 216 an interested party (e.g., notified party 140) concerning the occurrence of the reporting event (e.g., reporting event 102), event detection process 10 may notify 218 an owner (e.g., owner 106) of the vehicle (e.g., vehicle 100) of the occurrence of the reporting event (e.g., reporting event 102). Accordingly, event detection process 10 may notify 218 owner 106 that it appears that vehicle 100 has been stolen (e.g., as it is no longer within geofenced location 118) so that remedial actions may be taken (e.g., notifying law enforcement).

Further and when notifying 216 an interested party (e.g., notified party 140) concerning the occurrence of the reporting event (e.g., reporting event 102), event detection process 10 may notify 220 law enforcement personnel (e.g., law enforcement personnel 108) of the occurrence of occurrence of the reporting event (e.g., reporting event 102). Accordingly, event detection process 10 may notify 220 law enforcement personnel 108 that it appears that vehicle 100 has been stolen (e.g., as it is no longer within geofenced location 118) so that remedial actions may be taken (e.g., a police cruiser may be dispatched).

Additionally and when notifying 216 an interested party (e.g., notified party 140) concerning the occurrence of the reporting event (e.g., reporting event 102), event detection process 10 may notify 222 emergency personnel (e.g., emergency personnel 110) of the occurrence of occurrence of the reporting event (e.g., reporting event 102). Accordingly, event detection process 10 may notify 222 emergency personnel 110 that it appears that vehicle 100 has been e.g., involved in an accident (e.g., as an airbag was deployed) so that remedial actions may be taken (e.g., dispatching an ambulance).

Further and when notifying 216 an interested party (e.g., notified party 140) concerning the occurrence of the reporting event (e.g., reporting event 102), event detection process 10 may notify 224 roadside assistance (e.g., roadside assistance personnel 112) of the occurrence of occurrence of the reporting event (e.g., reporting event 102). Accordingly, event detection process 10 may notify 224 roadside assistance personnel 112 that it appears that vehicle 100 has e.g., broken down on the side of the road (e.g., two flat tires) so that remedial actions may be taken (e.g., dispatching a tow truck).

Event detection process 10 may enable 226 the notified party (e.g., notified party 140) to notify additional parties. For example, assume that the notified party (e.g., notified party 140) is the owner (e.g., owner 106) of the vehicle (e.g., vehicle 100). Accordingly and when enabling 226 the notified party (e.g., notified party 140) to notify additional parties, event detection process 10 may enable 228 the owner (e.g., owner 106) of the vehicle (e.g., vehicle 100) to notify one or more of: law enforcement personnel 108, emergency personnel 110, and roadside assistance personnel 112. Accordingly and when event detection process 10 notifies 218 owner 106 that it appears that vehicle 100 has been stolen (e.g., as it is no longer within geofenced location 118), event detection process 10 may inquire of the vehicle owner (e.g., 106) is they moved the car. And if not, event detection process 10 may enable 228 the owner (e.g., owner 106) of the vehicle (e.g., vehicle 100) to notify one or more of: law enforcement personnel 108.

Concept 2—Law Enforcement

As discussed above, event detection process 10 may monitor the status of a vehicle (e.g., vehicle 100) to determine if the vehicle (e.g., vehicle 100) is experiencing a reporting event (e.g., reporting event 102). And if such a reporting event (e.g., reporting event 102) is occurring, law enforcement personnel may be notified so that remedial action may be taken. As will be discussed below in greater detail, event detection process 10 may be utilized by law enforcement to implement a vast array of such remedial actions.

Figure 4:
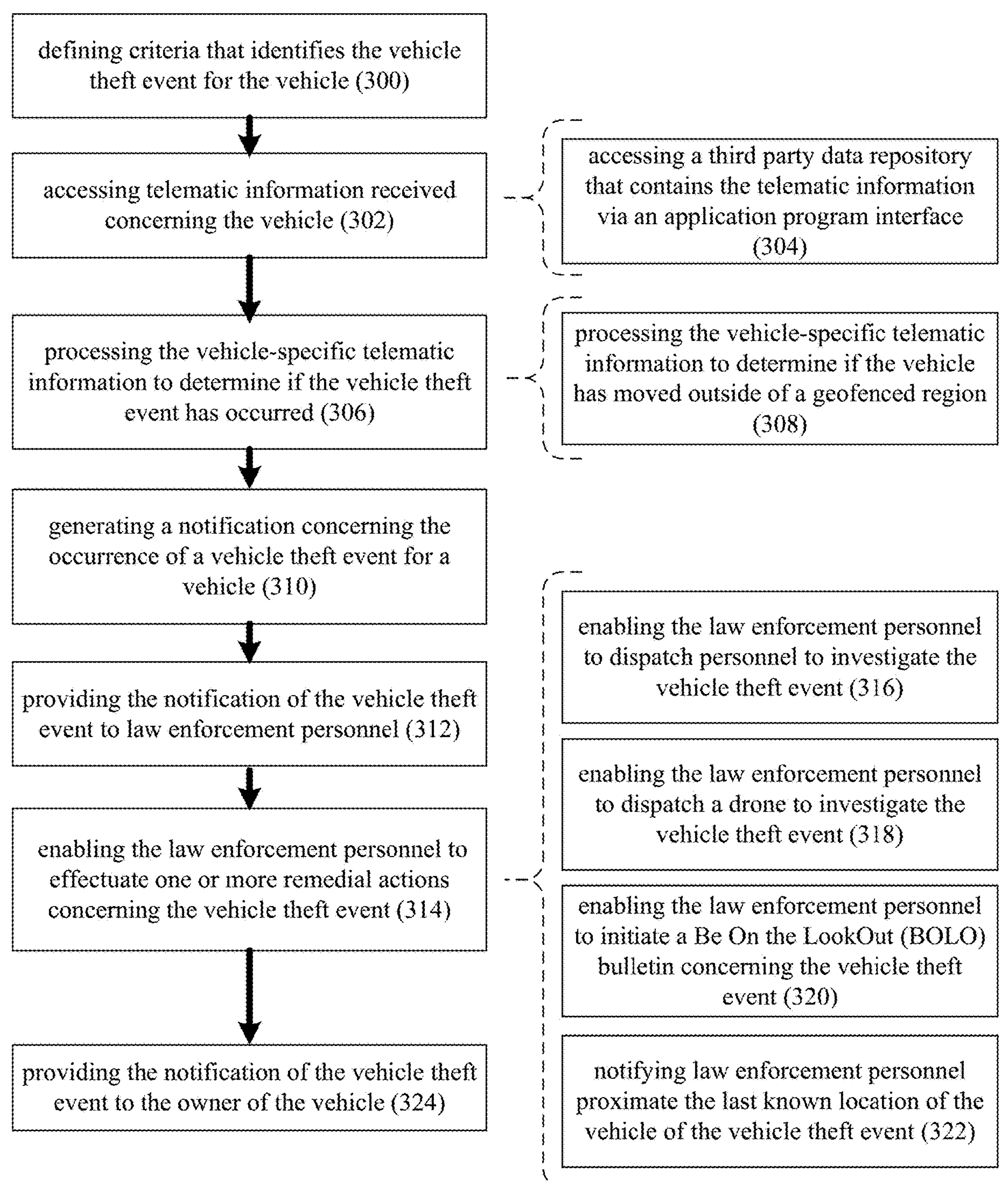
FIG. 4 is a flowchart of another implementation of the event detection process of FIG. 1 according to an implementation of the present disclosure.

Referring also to FIG. 4 and as discussed above, event detection process 10 may define 300 criteria (e.g., criteria 114) that identifies a vehicle theft event for the vehicle (e.g., vehicle 100).

As discussed above, a vehicle theft event refers to a situation where a monitoring system (e.g., event detection process 10) detects unauthorized access or movement of a vehicle (e.g., vehicle 100). Such "vehicle theft" criteria (e.g., criteria 114) may include but is not limited to the vehicle (e.g., vehicle 100) being moved from its parking space, the immobilizer of the vehicle (e.g., vehicle 100) being bypassed, the door of the vehicle (e.g., vehicle 100) being opened without the alarm being disabled, and the vehicle (e.g., vehicle 100) being placed at an extreme angle (e.g., as if being pulled onto a car carrier). Accordingly, such "vehicle theft" criteria (e.g., criteria 114) defined by the user (e.g., user 116) may include but is not limited to the vehicle (e.g., vehicle 100) being moved outside of its geofenced location (e.g., geofenced location 118); an immobilizer (e.g., immobilizer 120) of the vehicle (e.g., vehicle 100) indicating that it has been bypassed/disabled, the triggering of an alarm (e.g., alarm 122) of the vehicle (e.g., vehicle 100), and an angle sensor (e.g., angle sensor 124) of the vehicle (e.g., vehicle 100) indicating that the vehicle (e.g., vehicle 100) has been placed at a considerable angle (e.g., a 15 degrees change with respect to the original angle).

Further and as discussed above, event detection process 10 may access 302 telematic information received concerning the vehicle (e.g., vehicle 100), thus defining vehicle-specific telematic information (e.g., vehicle-specific telematic information 126). As discussed above, telematic information (e.g., vehicle-specific telematic information 126) in the context of a vehicle (e.g., vehicle 100) refers to the real-time/quasi-real-time transmission of data collected from various sensors and systems within the vehicle (e.g., vehicle 100). This data may include a wide range of information, such as the vehicle's location (via GPS), speed, engine performance, fuel levels, tire pressure, battery health, and even driving patterns like acceleration, braking, and cornering.

As discussed above and when accessing 302 telematic information (e.g., vehicle-specific telematic information 126) received concerning the vehicle (e.g., vehicle 100), event detection process 10 may access 304 a third party data repository (e.g., data repository 134) that contains the telematic information (e.g., vehicle-specific telematic information 126) via an application program interface (e.g., API 136).

As discussed above and to make this telematic information (e.g., vehicle-specific telematic information 126) available to the event detection process (e.g., event detection process 10) via an application program interface (i.e., API), the vehicle's telematics system (e.g., telematic system 138) must be designed to interface with external platforms. For example, the vehicle's telematics system (e.g., telematic system 138) may collect data such as GPS location, speed, tire pressure, and engine performance, which may then be wirelessly transmitted to a central cloud-based repository (e.g., data repository 134). This central cloud-based repository (e.g., data repository 134) is equipped with an API (e.g., API 136) that exposes endpoints for specific data, such as location or sensor readings. When the event detection process (e.g., event detection process 10) needs to assess the status of the vehicle (e.g., vehicle 100), event detection process 10 sends a request to the API (e.g., API 136), specifying the type of data required (e.g., the vehicle's current location or health metrics). The central cloud-based repository (e.g., data repository 134) may process the request and may return the data in a structured format (e.g., JSON or XML).

As discussed above, event detection process 10 may process 306 the vehicle-specific telematic information (e.g., vehicle-specific telematic information 126) to determine if (in this example) a vehicle theft event (e.g., reporting event 102) has occurred.

For example and when processing 306 the vehicle-specific telematic information (e.g., vehicle-specific telematic information 126) to determine if (in this example) the vehicle theft event (e.g., reporting event 102) has occurred, event detection process 10 may process 308 the vehicle-specific telematic information (e.g., vehicle-specific telematic information 126) to determine if the vehicle (e.g., vehicle 100) has moved outside of a geofenced region (e.g., geofenced location 118). As discussed above, indications of a vehicle theft event may include but are not limited to the vehicle (e.g., vehicle 100) being moved from its parking space, the immobilizer of the vehicle (e.g., vehicle 100) being bypassed, the door of the vehicle (e.g., vehicle 100) being opened without the alarm being disabled, and the vehicle (e.g., vehicle 100) being placed at an extreme angle (e.g., as if being pulled onto a car carrier). Accordingly, if the vehicle-specific telematic information (e.g., vehicle-specific telematic information 126) includes such indications, event detection process 10 may determine that a vehicle theft event (e.g., reporting event 102) has occurred.

Once it is determined that such a vehicle theft event (e.g., reporting event 102) has occurred, event detection process 10 may generate 310 a notification (e.g., notification 104) concerning the occurrence of a vehicle theft event (e.g., reporting event 102) for a vehicle (e.g., vehicle 100). This notification (e.g., notification 104) may contain various pieces of information concerning vehicle 100, examples of which may include but are not limited to: the make/model/year of vehicle 100, the owner of vehicle 100, the registered address of vehicle 100, the license plate of vehicle 100, the color of vehicle 100, the last known location of vehicle 100, and the current trajectory of vehicle 100.

Once generated 310, event detection process 10 may provide 312 the notification (e.g., notification 104) of the vehicle theft event to law enforcement personnel (e.g., law enforcement personnel 108), wherein event detection process 10 may enable 314 the law enforcement personnel (e.g., law enforcement personnel 108) to effectuate one or more remedial actions concerning the vehicle theft event.

For example and when enabling 314 the law enforcement personnel (e.g., law enforcement personnel 108) to effectuate one or more remedial actions concerning the vehicle theft event, event detection process 10 may enable 316 the law enforcement personnel (e.g., law enforcement personnel 108) to dispatch personnel to investigate the vehicle theft event. For example, law enforcement personnel 108 may dispatch a police cruiser (e.g., police cruiser 142) and/or one or more police officers to investigate the vehicle theft event, wherein these assets may be deployed to e.g., the location of the vehicle theft or the last known location of the stolen vehicle (e.g., vehicle 100).

Further and when enabling 314 the law enforcement personnel (e.g., law enforcement personnel 108) to effectuate one or more remedial actions concerning the vehicle theft event, event detection process 10 may enable 318 the law enforcement personnel (e.g., law enforcement personnel 108) to dispatch a drone (e.g., drone 144) to investigate the vehicle theft event. For example, law enforcement personnel 108 may dispatch a drone (e.g., drone 144) to investigate the vehicle theft event, wherein this asset may be deployed to e.g., the last known location of the stolen vehicle (e.g., vehicle 100).

Additionally and when enabling 314 the law enforcement personnel (e.g., law enforcement personnel 108) to effectuate one or more remedial actions concerning the vehicle theft event, event detection process 10 may enable 320 the law enforcement personnel (e.g., law enforcement personnel 108) to initiate a Be On the LookOut (BOLO) bulletin concerning the vehicle theft event. For example, event detection process 10 may enable 320 the law enforcement personnel (e.g., law enforcement personnel 108) to initiate a Be On the LookOut (BOLO) bulletin for all law enforcement personnel (e.g., law enforcement personnel 108) currently on duty.

Further and when enabling 314 the law enforcement personnel (e.g., law enforcement personnel 108) to effectuate one or more remedial actions concerning the vehicle theft event, event detection process 10 may notify 322 law enforcement personnel (e.g., law enforcement personnel 108) proximate the last known location of the vehicle (e.g., vehicle 100) of the vehicle theft event. For example, assume that the vehicle theft occurred in New York City and the last known location of the stolen vehicle (e.g., vehicle 100) is Midtown Manhattan. Accordingly, event detection process 10 may notify 322 law enforcement personnel (e.g., law enforcement personnel 108) proximate (e.g., within a mile) of Midtown Manhattan.

Additionally, event detection process 10 may provide 324 the notification (e.g., notification 104) of the vehicle theft event to the owner (e.g., owner 106) of the vehicle (e.g., vehicle 100).

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable legal research processing apparatus, such that the instructions, which execute via the processor of the computer or other programmable legal research processing apparatus, create means for implementing the functions/acts specified in the flowchart and/or block diagram block or blocks.

These computer program instructions may also be stored in a computer-readable memory that may direct a computer or other programmable legal research processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable legal research processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

defining criteria that identifies a vehicle theft event for a vehicle;

accessing vehicle-specific telematic information received concerning the vehicle;

processing the vehicle-specific telematic information to determine if the vehicle theft event has occurred, wherein processing the vehicle-specific telematic information includes:

processing the vehicle-specific telematic information using an artificial intelligence (AI) process to determine a telematic baseline for the vehicle based upon, at least in part, vehicle positional data defining vehicle location and timing associated with the vehicle location, and determining that the vehicle theft has occurred by recognizing a deviation in the telematic baseline based upon, at least in part, a deviation in the vehicle positional data based on the vehicle location and the timing associated with the vehicle location;

generating a notification concerning the occurrence of the vehicle theft event for the vehicle, wherein generating the notification concerning the occurrence of the vehicle theft event for the vehicle includes providing the notification of the vehicle theft event to the owner of the vehicle;

providing the notification of the vehicle theft event to law enforcement personnel, wherein providing the notification of the vehicle theft event to the law enforcement personnel includes:

prompting the owner of the vehicle for consent to provide the notification of the vehicle theft event to the law enforcement personnel, granting the law enforcement personnel with direct access to vehicle-specific telematic information, and generating vehicle location information associated with the vehicle on an electronic map accessible by the law enforcement personnel based upon, at least in part, the vehicle-specific telematic information; and enabling the law enforcement personnel to effectuate one or more remedial actions concerning the vehicle theft event.

2. The computer-implemented method of claim 1 wherein accessing telematic information received concerning the vehicle includes:

accessing a third party data repository that contains the telematic information via an application program interface.

3. The computer-implemented method of claim 1 wherein processing the vehicle-specific telematic information to determine if the vehicle theft event has occurred includes:

processing the vehicle-specific telematic information to determine if the vehicle has moved outside of a geofenced region.

4. The computer-implemented method of claim 1 wherein enabling the law enforcement personnel to effectuate one or more remedial actions concerning the vehicle theft event includes:

enabling the law enforcement personnel to dispatch personnel to investigate the vehicle theft event.

5. The computer-implemented method of claim 1 wherein enabling the law enforcement personnel to effectuate one or more remedial actions concerning the vehicle theft event includes:

enabling the law enforcement personnel to dispatch a drone to investigate the vehicle theft event.

6. The computer-implemented method of claim 1 wherein enabling the law enforcement personnel to effectuate one or more remedial actions concerning the vehicle theft event includes:

enabling the law enforcement personnel to initiate a Be On the LookOut (BOLO) bulletin concerning the vehicle theft event.

7. The computer-implemented method of claim 1 wherein the notification of the vehicle theft event defines a last known location of the vehicle.

8. The computer-implemented method of claim 7 wherein enabling the law enforcement personnel to effectuate one or more remedial actions concerning the vehicle theft event includes:

notifying law enforcement personnel proximate the last known location of the vehicle of the vehicle theft event.

9. A computer program product residing on a non-transitory computer readable medium having a plurality of instructions stored thereon which, when executed by a processor, cause the processor to perform operations comprising:

defining criteria that identifies a vehicle theft event for a vehicle;

accessing vehicle-specific telematic information received concerning the vehicle;

processing the vehicle-specific telematic information to determine if the vehicle theft event has occurred, wherein processing the vehicle-specific telematic information includes:

processing the vehicle-specific telematic information using an artificial intelligence (AI) process to determine a telematic baseline for the vehicle based upon, at least in part, vehicle positional data defining vehicle location and timing associated with the vehicle location, and determining that the vehicle theft has occurred by recognizing a deviation in the telematic baseline based upon, at least in part, a deviation in the vehicle positional data based on the vehicle location and the timing associated with the vehicle location;

generating a notification concerning the occurrence of the vehicle theft event for the vehicle, wherein generating the notification concerning the occurrence of the vehicle theft event for the vehicle includes providing the notification of the vehicle theft event to the owner of the vehicle;

prompting the owner of the vehicle for consent to grant law enforcement personnel with direct access to vehicle-specific telematic information;

generating vehicle location information associated with the vehicle on an electronic map accessible by the law enforcement personnel based upon, at least in part, the vehicle-specific telematic information; and enabling the law enforcement personnel to effectuate one or more remedial actions concerning the vehicle theft event.

10. The computer program product of claim 9 wherein accessing telematic information received concerning the vehicle includes:

accessing a third party data repository that contains the telematic information via an application program interface.

11. The computer program product of claim 9 wherein processing the vehicle-specific telematic information to determine if the vehicle theft event has occurred includes:

processing the vehicle-specific telematic information to determine if the vehicle has moved outside of a geofenced region.

12. The computer program product of claim 9 wherein enabling the law enforcement personnel to effectuate one or more remedial actions concerning the vehicle theft event includes:

enabling the law enforcement personnel to dispatch personnel to investigate the vehicle theft event.

13. The computer program product of claim 9 wherein enabling the law enforcement personnel to effectuate one or more remedial actions concerning the vehicle theft event includes:

enabling the law enforcement personnel to dispatch a drone to investigate the vehicle theft event.

14. The computer program product of claim 9 wherein enabling the law enforcement personnel to effectuate one or more remedial actions concerning the vehicle theft event includes:

enabling the law enforcement personnel to initiate a Be On the LookOut (BOLO) bulletin concerning the vehicle theft event.

15. The computer program product of claim 9 wherein the notification of the vehicle theft event defines a last known location of the vehicle.

16. The computer program product of claim 15 wherein enabling the law enforcement personnel to effectuate one or more remedial actions concerning the vehicle theft event includes:

notifying law enforcement personnel proximate the last known location of the vehicle of the vehicle theft event.

17. A computing system including a processor and memory configured to perform operations comprising:

defining criteria that identifies a vehicle theft event for a vehicle;

accessing vehicle-specific telematic information received concerning the vehicle;

processing the vehicle-specific telematic information to determine if the vehicle theft event has occurred, wherein processing the vehicle-specific telematic information includes:

processing the vehicle-specific telematic information using an artificial intelligence (AI) process to determine a telematic baseline for the vehicle based upon, at least in part, vehicle positional data defining vehicle location and timing associated with the vehicle location, and determining that the vehicle theft has occurred by recognizing a deviation in the telematic baseline based upon, at least in part, a deviation in the vehicle positional data based on the vehicle location and the timing associated with the vehicle location;

generating a notification concerning the occurrence of the vehicle theft event for the vehicle, wherein generating the notification concerning the occurrence of the vehicle theft event for the vehicle includes providing the notification of the vehicle theft event to the owner of the vehicle;

providing the notification of the vehicle theft event to law enforcement personnel, wherein providing the notification of the vehicle theft event to the law enforcement personnel includes:

prompting the owner of the vehicle for consent to provide the notification of the vehicle theft event to the law enforcement personnel, granting the law enforcement personnel with direct access to vehicle-specific telematic information, and generating vehicle location information associated with the vehicle on an electronic map accessible by the law enforcement personnel based upon, at least in part, the vehicle-specific telematic information; and enabling the law enforcement personnel to effectuate one or more remedial actions concerning the vehicle theft event.

18. The computing system of claim 17 wherein accessing telematic information received concerning the vehicle includes:

accessing a third party data repository that contains the telematic information via an application program interface.

19. The computing system of claim 17 wherein processing the vehicle-specific telematic information to determine if the vehicle theft event has occurred includes:

processing the vehicle-specific telematic information to determine if the vehicle has moved outside of a geofenced region.

20. The computing system of claim 17 wherein enabling the law enforcement personnel to effectuate one or more remedial actions concerning the vehicle theft event includes:

enabling the law enforcement personnel to dispatch personnel to investigate the vehicle theft event.

21. The computing system of claim 17 wherein enabling the law enforcement personnel to effectuate one or more remedial actions concerning the vehicle theft event includes:

enabling the law enforcement personnel to dispatch a drone to investigate the vehicle theft event.

22. The computing system of claim 17 wherein enabling the law enforcement personnel to effectuate one or more remedial actions concerning the vehicle theft event includes:

enabling the law enforcement personnel to initiate a Be On the LookOut (BOLO) bulletin concerning the vehicle theft event.

23. The computing system of claim 17 wherein the notification of the vehicle theft event defines a last known location of the vehicle.

24. The computing system of claim 23 wherein enabling the law enforcement personnel to effectuate one or more remedial actions concerning the vehicle theft event includes:

notifying law enforcement personnel proximate the last known location of the vehicle of the vehicle theft event.

* * * * *